US012802656B2

(12) United States Patent
Jun et al.

(10) Patent No.: US 12,802,656 B2
(45) **Date of Patent: *Nov. 17, 2026**

(54) DATA DRIVER AND DISPLAY DEVICE HAVING THE SAME

(71) Applicant: LG Display Co., Ltd., Seoul (KR)

(72) Inventors: Eunjin Jun, Paju-si (KR); HyunChul Kim, Paju-si (KR); Seryong Park, Paju-si (KR); Jaemin You, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/328,704

(22) Filed: Sep. 15, 2025

(65) Prior Publication Data

US 2026/0134842 A1 May 14, 2026

(30) Foreign Application Priority Data

Nov. 8, 2024 (KR) ........................ 10-2024-0157827

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2310/0275* (2013.01); *G09G 2310/0291* (2013.01); *G09G 2310/08* (2013.01); *G09G 2330/021* (2013.01)

(58) Field of Classification Search
CPC .......... G09G 2310/0291; G09G 3/3685–3692; G09G 3/3291; G09G 3/32; G09G 2310/0275; G09G 2310/08; G09G 2330/021
USPC .......................................................... 345/204
See application file for complete search history.

(56) References Cited

U.S. PATENT DOCUMENTS

| | | | | |
|---|---|---|---|---|
| 12,002,417 | B2 | 6/2024 | Kim et al. | |
| 2006/0139258 | A1* | 6/2006 | Choi | G09G 3/3291 345/76 |
| 2013/0307838 | A1 | 11/2013 | Kim et al. | |
| 2022/0014195 | A1* | 1/2022 | Choi | H03K 19/018521 |
| 2022/0415279 | A1* | 12/2022 | Kang | G09G 3/3688 |

FOREIGN PATENT DOCUMENTS

| | | | |
|---|---|---|---|
| KR | 20130128933 | A | 11/2013 |
| KR | 20230164359 | A | 12/2023 |

* cited by examiner

*Primary Examiner* — Nathan P Brittingham
(74) *Attorney, Agent, or Firm* — Seed Intellectual Property Law Group LLP

(57) ABSTRACT

The display device includes a display panel configured to display an image, and including pixels and data lines connected to the pixels, a timing controller configured to provide image data corresponding to the image, and a data driver including at least one output buffer configured to output an analog data voltage corresponding to the image data to a channel electrically connected to a data line. The output buffer includes one or more transistors for applying a preset rising current or falling current for outputting the data voltage to an output node connected to the channel, and a capacitance adjustment circuit configured to adjust a capacitance of the output node based on the magnitude or rate of a data voltage change between adjacent pixel rows.

16 Claims, 7 Drawing Sheets

DATA DRIVER AND DISPLAY DEVICE HAVING THE SAME

CROSS-REFERENCE TO RELATED APPLICATION

This application claims priority from Korean Patent Application No. 10-2024-0157827, filed on Nov. 8, 2024, in the Korean Intellectual Property Office, which is hereby incorporated by reference for all purposes as if fully set forth herein.

BACKGROUND

Technical Field

The present disclosure relates to display devices, and more specifically, to a data driver and a display device including the data driver.

Description of the Related Art

In today's information society, display devices for presenting images or visual information to users are increasingly important. The need for such display devices has caused display technology to be rapidly developed, and various types of display devices, such as a liquid crystal display (LCD) device, an organic light emitting diode (OLED) display device, and the like, have been developed and used.

The display device can include a data driver configured to generate analog driving signals required for driving a display panel, and the data driver can include an output amplifier, a buffer, and the like for outputting the analog driving signals.

The output amplifier or the buffer may include at least one compensation capacitor to obtain a phase margin. The larger the capacity of the compensation capacitor, the greater the phase margin may be, and the more stable the output of the amplifier may be. In contrast, when the capacity of the compensation capacitor is large, charge and discharge characteristics can become poor, which may be disadvantageous for high-speed driving.

BRIEF SUMMARY

One or more aspects of the present disclosure may provide a data driver configured to adjust the capacitance of an output node of an output buffer based on the magnitude (or rate) of a data voltage change.

One or more aspects of the present disclosure may provide a display device including the data driver.

Aspects, examples, and embodiments provided in the present disclosure are not limited to the foregoing description, and various changes and modifications could be made without departing from the spirit and scope of the present disclosure.

According to one or more example embodiments of the present disclosure, a display device can be provided that includes a display panel configured to display an image, and including pixels and data lines connected to the pixels, a timing controller configured to provide image data corresponding to the image, and a data driver including at least one output buffer configured to output an analog data voltage corresponding to the image data to a channel electrically connected to a corresponding one of the data lines. In one or more aspects, the output buffer may include one or more transistors for applying a preset rising current or falling current for outputting the data voltage to an output node connected to the channel, and a capacitance adjustment circuit configured to adjust a capacitance of the output node based on the magnitude or rate of a data voltage change between adjacent pixel rows.

In one or more aspects, the one or more transistors may include a pull-up transistor connected between a high voltage source or a high voltage node and the output node, and a pull-down transistor connected between the output node and a low voltage source or a low voltage node.

In one or more aspects, the capacitance adjustment circuit may include compensation capacitors connected in parallel between a common node of a gate electrode of the pull-up transistor and a gate electrode of the pull-down transistor and the output node, and switches connected between the common node and respective one ends of the compensation capacitors, and selectively switching the compensation capacitors based on output control information.

In one or more aspects, the switches can control the number of compensation capacitors connected to the common node based on a voltage difference between a first data voltage supplied to pixels of a previous pixel row and a second data voltage supplied to a current pixel row.

In one or more aspects, the number of compensation capacitors connected to the common node among the compensation capacitors may decrease as a difference between the first data voltage and the second data voltage increases.

In one or more aspects, an equivalent capacitance by the compensation capacitors may decrease as a difference between the first data voltage and the second data voltage increases.

In one or more aspects, the data driver may further include a latch circuit configured to rearrange the image data in a parallel type, a line memory for storing the rearranged image data output from the latch circuit on a pixel row basis, a compare circuit configured to calculate a difference between image data of a previous pixel row output from the line memory and image data of a current pixel row output from the latch circuit, and a controller configured to control turn-on or turn-off of the switches based on the calculation result of the compare circuit.

In one or more aspects, the compare circuit can calculate a difference in the image data between the adjacent pixel rows for each channel.

In one or more aspects, the switches may include first to third switches, and the first to third switches may operate such that: when the difference of the image data is less than a first threshold value, the first to third switches are turned on; when the difference of the image data is greater than or equal to the first threshold value and less than a second threshold value greater than the first threshold value, two of the first to third switches are turned on; and when the difference of the image data is greater than or equal to the second threshold value, one of the first to third switches is turned on.

In one or more aspects, the data driver may further include a digital-to-analog converter configured to convert the rearranged image data into the data voltage and provide the data voltage to the output buffer.

According to one or more example embodiments of the present disclosure, a data driver can be provided that includes a latch circuit configured to rearrange image data provided serially in a parallel type, a digital-to-analog converter configured to convert the rearranged image data into a data voltage, an output buffer configured to output the data voltage to an output node connected to a data line. In one or more aspects, the output buffer may include a capacitance adjustment circuit configured to adjust the capacitance of the output node based on the magnitude or rate of a change between data voltages that are continuously output.

In one or more aspects, the output buffer may include one or more transistors for applying a preset rising current or falling current for outputting the data voltage to an output node connected to the channel.

In one or more aspects, the capacitance adjustment circuit may include compensation capacitors connected in parallel between a common node of a gate electrode of the pull-up transistor and a gate electrode of the pull-down transistor and the output node, and switches connected between the common node and respective one ends of the compensation capacitors, and selectively switching the compensation capacitors based on output control information.

In one or more aspects, the data driver may further include a line memory for storing the rearranged image data output from the latch circuit on one horizontal cycle basis, a compare circuit configured to calculate a difference between image data of a previous pixel row output from the line memory and image data of a current pixel row output from the latch circuit, and a controller configured to control turn-on or turn-off of the switches based on the calculation result of the compare circuit.

In one or more aspects, the switches can control the number of compensation capacitors connected to the common node based on a voltage difference between a first data voltage supplied to pixels of a previous pixel row and a second data voltage supplied to a current pixel row.

In one or more aspects, an equivalent capacitance by the compensation capacitors may decrease as a difference between the first data voltage and the second data voltage increases.

According to one or more aspects, the data driver and the display device including the data driver can improve both a phase margin characteristic (minimizing output oscillation) and data charge and discharge characteristics (slew rate control) by adjusting a compensation capacitance of at least one output buffer based on a difference between image data (data voltages) of adjacent horizontal periods (pixel rows). According to one or more aspects, in a period where the magnitude or rate of a data change is relatively small, the compensation capacitance can be increased to improve the phase margin characteristic, and in a period when the magnitude or rate of a data change is relatively large, the compensation capacitance can be decreased to improve the data charge and discharge characteristics. Thereby, the image quality of the display panel or display device can be improved.

According to one or more aspects, power consumption can be reduced by adaptively adjusting the compensation capacitance of the output buffer as needed.

Aspects, examples, and embodiments provided in the present disclosure are not limited to the foregoing description, and various changes and modifications could be made without departing from the spirit and scope of the present disclosure.

BRIEF DESCRIPTION OF THE SEVERAL VIEWS OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. It should be therefore understood that aspects, examples, and embodiments described herein are not limited to the illustrations of the accompanying drawings. In the drawings.

DETAILED DESCRIPTION

Figure 1:
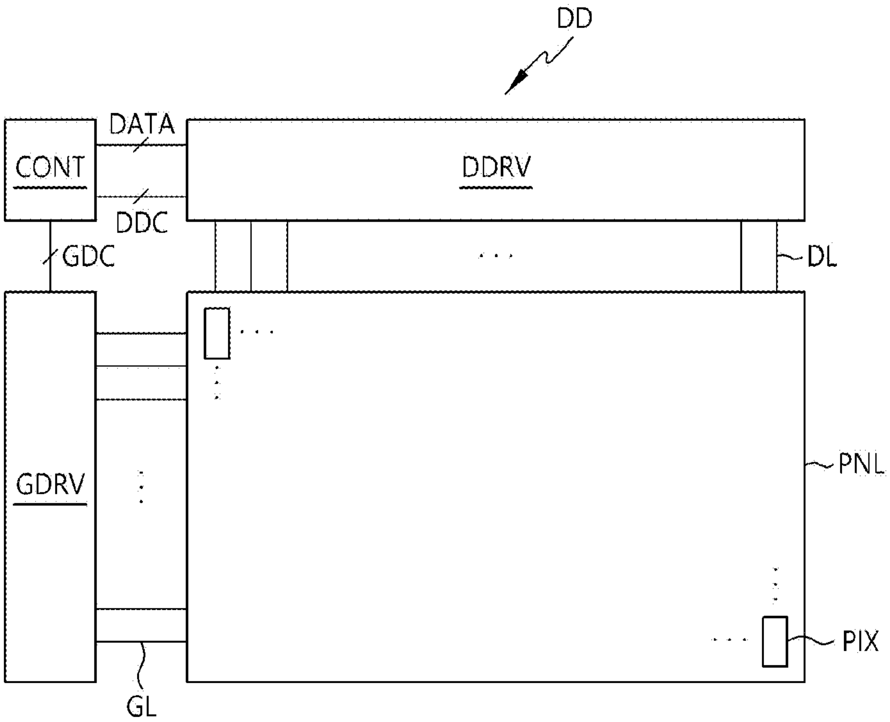
FIG. 1 illustrates schematically an example display device according to aspects of the present disclosure.

In the following description of aspects, examples or embodiments of the present disclosure, reference will be made to accompanying drawings in which it is shown by way of illustration specific aspects, examples or embodiments that can be implemented, and in which the same reference numerals and signs can be used to designate the same or like components even when they are shown in different accompanying drawings from one another. For conciseness and convenience of description, in discussing respective configurations of the accompanying drawings, discussions in following drawings for features equal, substantially equal, or similar to features described with reference to previous drawing may be omitted or briefly described.

Aspects, examples or embodiments provided herein have been presented to enable any person skilled in the art to make and use the technical idea of the present disclosure, and have been provided in the context of a particular application and its requirements. Various modifications, additions and substitutions to the described embodiments will be readily apparent to those skilled in the art, and the principles described herein may be applied to other aspects, examples, embodiments, and applications without departing from the scope of the present disclosure.

The accompanying drawings provide examples of the technical idea of the present disclosure for illustrative purposes only. The configurations or structures illustrated in the drawings may be exaggerated as necessary to help understand aspects, examples or embodiments of the present disclosure, and thus, aspects, examples or embodiments of the present disclosure are not limited by configurations or structures of the drawings.

Further, in the following description of aspects, examples or embodiments of the present disclosure, detailed descriptions of well-known functions and components incorporated herein will be omitted when it is determined that the description may make the subject matter in some aspects, examples or embodiments of the present disclosure rather unclear.

FIG. 1 illustrates schematically an example display device according to aspects of the present disclosure.

Referring to FIG. 1, in one or more example embodiments, a display device DD may include a display panel PNL and a driving circuit for writing pixel data to pixels PIX of the display panel PNL.

The display panel PLN may have a rectangular structure, but aspects of the present disclosure are not limited thereto. For example, the display panel PNL may be a heterogeneous panel having at least a portion of a curve or an oval.

The display panel PNL includes at least one pixel array for displaying an input image. The pixel array may include a plurality of data lines DL, a plurality of gate lines 103 intersecting the data lines DL, and a plurality of pixels PIX disposed in a matrix form. The display panel PNL may further include power lines commonly connected to pixels PIX. The power lines can supply voltages needed for driving the pixels PIX to the pixels PIX.

Each pixel PIX may include a red subpixel, a green subpixel, and a blue subpixel. Each pixel may further include a white subpixel. Each subpixel may include a pixel circuit for driving a respective light emitting element. The light emitting element may include an organic light emitting diode (OLED) or an inorganic light emitting diode (LED). The pixel circuit may be connected to at least one data line DL, at least one gate line GL, and at least one power line. Hereinafter, for convenience of description, a pixel may represent a subpixel. However, since this is merely one example for convenience of description, the display panel PNL and pixels PIX discussed herein are not limited thereto. For example, the display device DD may be various types of display devices such as a liquid crystal display device.

In one or more aspects, pixels PIX included in one pixel row may share one or more gate lines GL. Further, pixels PIX included in one pixel column may share a data line DL. One horizontal period (e.g., 1H) may be a time period obtained by dividing one frame period by the total number of pixel rows.

The display panel PNL may be implemented as a non-transparent display panel PNL or a transparent display panel PNL. The transparent display panel PNL may be applied to a transparent display device DD. The display panel PNL may be implemented as a flexible display panel PNL, a foldable display panel PNL, a slidable display panel PNL, or the like.

A timing controller CONT, a data driver DDRV, and a gate driver GDRVL may be included in the display device DD as driving circuits for driving the display panel PN.

Further, a touch sensor driver for driving touch sensors may be included in the display device DD. For example, the data driver DDRV and the touch sensor driver may be integrated into one source drive integrated circuit (SDIC).

The timing controller CONT can generate at least one data timing control signal DDC for controlling operation timing of the data driver DDRV and at least one gate timing control signal GDC for controlling operation timing of the gate driver GDRV based on timing signals such as a vertical synchronization signal Vsync, a horizontal synchronization signal Hsync, a data enable signal DE, and the like input from a host system (not shown). The gate timing control signal GDC may include, for example, a gate start signal, gate shift clocks, and the like. The data timing control signal DDC may include, for example, a source start pulse, a source sampling clock, a source output enable signal, and the like.

The timing controller CONT can provide image data DATA input from the host system to the data driver DDRV through an internal interface circuit. The image data DATA can be converted into a data voltage by the data driver DDRV, and then written to corresponding one or more pixels PIX. The internal interface circuit may be an embedded panel interface (EPI) circuit.

The data driver DDRV can convert digital image data DATA received from the timing controller CONT into an analog data voltage, and apply the resulting analog data voltage to corresponding one or more pixels PIX. The data driver DDRV can receive gamma reference voltages and generate gamma voltages for each gray level through a voltage divider circuit. The gamma voltages for each gray level can be supplied to a digital-to-analog converter (DAC) connected in each of channels of the data driver DDRV.

The data driver DDRV can sample input image data DATA, latch the sampled image data, and then convert the image data into an analog data voltage. The data driver DDRV may include at least one output buffer configured to output the data voltage to a channel connected to a corresponding data line DL.

In one or more aspects, the output buffer can adjust a capacitance affecting an output signal based on the magnitude (or rate) of a data voltage change between adjacent pixel rows. Accordingly, a slew rate of data voltages transitioning according to the magnitude (or rate) of a change of image data DATA can be controlled.

The gate driver GDRV may be disposed in the display panel PNL. The gate driver GDRV can output pulses of a gate signal to gate lines GL simultaneously or sequentially by the control of the timing controller CONT. For example, the gate driver GDRV can shift pulses of a gate signal and supply the shifted pulses to the gate lines GL sequentially.

Figure 2:
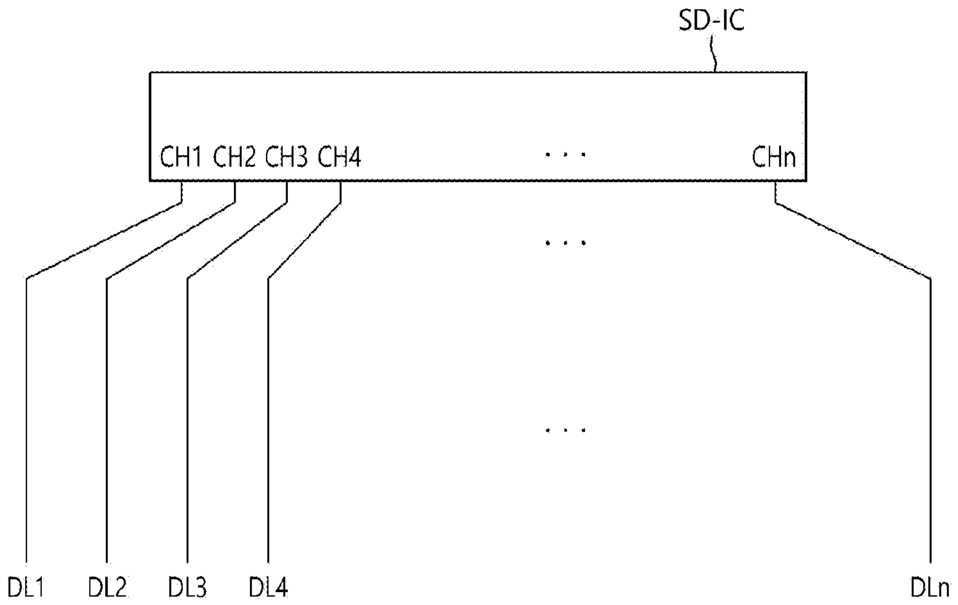
FIG. 2 illustrates an example connection between a data driver and data lines in the display device according to aspects of the present disclosure.

FIG. 2 illustrates an example connection between the data driver DDRV and data lines DL in the display device DD according to aspects of the present disclosure.

Referring to FIGS. 1 and 2, in one or more example embodiments, the data driver DDRV may include at least one source driver integrated circuit SD-IC.

The source driver integrated circuit SD-IC can obtain a data timing control signal DDC and image data DATA from an embedded clock point-point interface (EPI) packet received from the timing controller CONT. The source driver integrated circuit SD-IC can output a respective analog data voltage to each of data lines (DL1 to DLn) connected to channels (CH1 to CHn) according to a source output enable signal (SOE) included in the data timing control signal DDC.

The source driver integrated circuit SD-IC can convert the image data DATA into data voltages based on the data timing control signal DDC, and then supply the resulting data voltages to the data lines (DL1 to DLn) connected to the channel (CH1 to CHn).

In this configuration, the source driver integrated circuit SD-IC can obtain a difference resulting from comparing image data of a previous pixel row (e.g., $(n-1)^{th}$ image data, where n is a natural number greater than 1) and image data of a current pixel row (e.g., $n^{th}$ image data), and can control capacitances (e.g., frequency compensation capacitances) set to the channels (CH1 to CHn) based on the comparison result. According to this implementation, both phase margin characteristics and data charge and discharge characteristics can be improved.

For example, when there is no data change in one or more channels, the source driver integrated circuit SD-IC can increase the capacitances of corresponding one or more channels, and thereby stabilize phase margins and prevent output oscillation. When a level of data change in one or more channels is greater than a predefined level, the source driver integrated circuit SD-IC can minimize the capacitances of corresponding one or more channels, and thereby increase a voltage transition slew rate.

Hereinafter, capacitances set to the channels (CH1 to CHn) may be understood to have the same meaning as frequency compensation capacitances.

Figure 3:
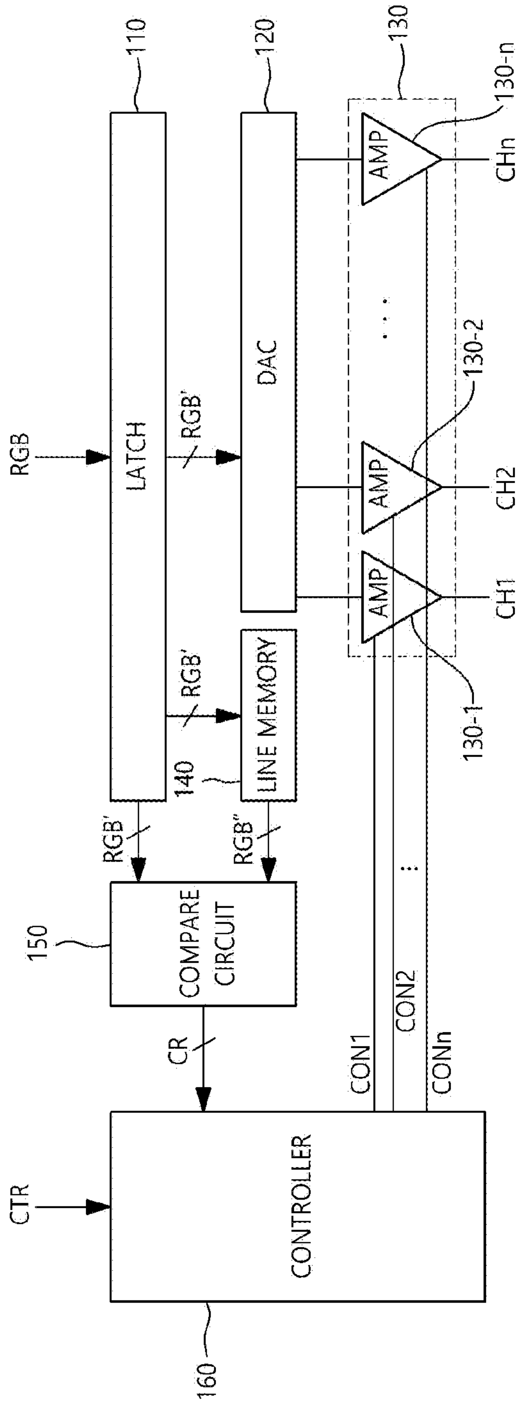
FIG. 3 illustrates an example configuration of the data driver of FIG. 2.

FIG. 3 illustrates an example configuration of the data driver DDRV of FIG. 2.

Referring to FIGS. 2 and 3, in one or more example embodiments, the data driver (DDRV, or source driver integrated circuit SD-IC) may include a latch circuit 110, a digital-to-analog converter 120, a buffer circuit 130 (or output buffer circuit 130), a line memory 140, a compare circuit 150, and a controller 160.

The data driver 100 can output a data voltage based on a data packet provided from the timing controller CONT. The data packet may include clock training data, control data CTR, and image data RGB. For example, the control data CTR may include power control information for determining periods to apply different bias currents for each horizontal period.

The controller 160 can sample bits of the control data CTR according to internal clock timing, and restore a data timing control signal (DDC, see FIG. 1) for controlling the operation of the data driver 100 from the sampled control data CTR.

The controller 160 can sample, by using signals received through an EPI packet formed in a serial type, image data RGB according to internal clock timing.

In one or more aspects, the controller 160 can generate control signals provided to the buffer circuit 130 based on a calculated result CR received from the compare circuit 150. For example, the controller 160 can generate output control information (CON1 to CONn) for output buffers (130-1 to **130-*n*) based on a calculated result CR from the compare circuit 150, and can restore the output control information by sampling the output control information according to internal clock timing. The output control information (CON1 to CONn, or output control signals) may be independently set and restored for each channel (CH1 to CHn) of the buffer circuit 130**.

The output control information (CON1 to CONn) may include information for controlling data voltage output times of the buffer circuit 130 and information for controlling compensation capacitances. The output control information (CON1 to CONn) may include switching timing control information for selectively connecting or disconnecting two or more compensation capacitors included in the buffer circuit 130 to adjust capacitances (or compensation capacitances) of the buffer circuit 130 according to periods in which data voltages are output. For example, switches respectively connected to a plurality of compensation capacitors included in the buffer circuit 130 can be turned on or off based on the output control information (CON1 to CONn).

When the switches are turned on, the compensation capacitances can increase by the compensation capacitors connected to the switches. Accordingly, the phase margin characteristics of outputs of the output buffers (130-1 to **130-*n*) connected to the corresponding compensation capacitors can be improved, and the oscillation occurring in a respective data voltage output from each of the output buffers (130-1 to 130-*n***) can be reduced.

When the switches are turned off, the compensation capacitors connected to the corresponding switches are disconnected, and thereby, the compensation capacitances can be reduced. Accordingly, the charging and discharging characteristics of the output buffers can be improved, and corresponding slew rates can be increased. For example, a data voltage output from an output buffer can have a fast slewing time or a fast settling time.

In one or more aspects, the output control information (CON1 to CONn) can be determined based on a difference of respective continuous image data supplied to the output buffers. For example, the output control information (CON1 to CONn) can be determined based on the magnitude (or rate) of a data voltage change between adjacent pixel rows.

When the magnitude (or rate) of a data voltage change between adjacent pixel rows is small, the output control information (CON1 to CONn) may be set to increase the equivalent capacitance of the compensation capacitors to reduce output oscillation. As the magnitude (or rate) of a data voltage change between adjacent pixel rows increases, the output control information (CON1 to CONn) may be set to reduce the equivalent capacitance of the compensation capacitors to increase slew rates. In one or more aspects, the output control information (CON1 to CONn) may be individually set to a respective one of the output buffers (130-1 to **130-*n***).

In one or more aspects, the data driver 100 or the controller 160 may further include a shift register. The shift register can shift a clock provided from a timing controller, generate sampling clocks, and sequentially output the generated sampling clocks to the latch circuit 110.

The latch circuit 110 can sample and rearrange image data RGB according to times of the sampling clocks inputted sequentially, and simultaneously output the rearranged image data RGB'. The latch circuit 110 may be synchronized with the sampling clocks output from the controller 160. The latch circuit 110 can provide the image data RGB' to at least one of the digital-to-analog converter 120, the line memory 140, and the compare circuit 150.

The digital-to-analog converter 120 can convert the rearranged image data RGB' into an analog data voltage using a gamma voltage.

The buffer circuit 130 may include the output buffers (330-1 to **330-*n*). The output buffers (330-1 to 330-*n*) can output data voltages to the channels (CH1 to CHn), respectively. The respective compensation capacitances of the output buffers (330-1 to 330-*n*) may be controlled according to output control information (CON1 to CONn) individually input from the controller 160**. Respective slew rates of data voltages and respective oscillation of the data voltages outputted according to changes in the compensation capacitances can be controlled.

The line memory 140 can store the rearranged image data RGB' output from the latch circuit 110 on a pixel row data basis (i.e., a horizontal line basis). For example, the line memory 140 may be a volatile memory in which data is deleted when power is turned off. The volatile memory may include dynamic random access memory (DRAM) or static random access memory (SRAM). In one or more aspects, the line memory 140 may include non-volatile memory such as flash memory.

The compare circuit 150 may calculate or determine a difference between image data RGB" of a previous pixel row output from the line memory 140 and image data RGB' of a current pixel row output from the latch circuit 110. In one or more aspects, the compare circuit 150 can individually calculate or determine a difference between image data of adjacent pixel rows respectively corresponding to the output channels (CH1 to CHn). Accordingly, compensation capacitances for the outputs of the channels (CH1 to CHn) can be individually controlled. The compare circuit 150 can include various types of hardware and/or software that calculate or determine a difference in amounts or sizes of digital data.

The compare circuit 150 can provide the calculation or determination result CR to the controller 160. For example, the compare circuit 150 can provide a difference between data amounts of previous image data and current image data corresponding to each of the channels (CH1 to CHn) as the calculation or determination result CR to the controller 160.

In one or more aspects, the compare circuit 150 can compare the data amount difference with at least one threshold value and provide data representing the comparison result to the controller 160 as the calculation or determination result CR.

The controller 160 can generate output control information (CON1 to CONn) for controlling turn-ons and turn-offs of the switches included in the output buffers (330-1 to 330-*n*) based on the calculation or determination result CR. The output control information (CON1 to CONn) may be control signals for controlling the switches.

Figure 4:
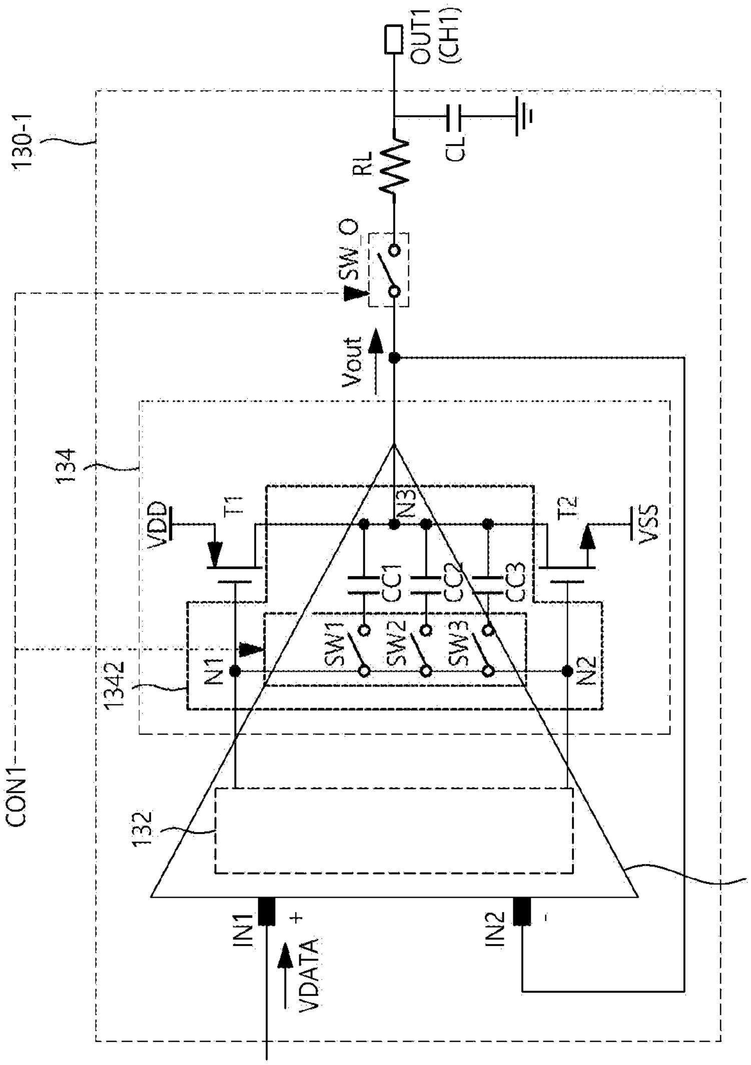
FIG. 4 illustrates an example output buffer included in the data driver of FIG. 3.

FIG. 4 illustrates one example output buffer included in the data driver DDRV of FIG. 3.

FIG. 4 illustrates one of the output buffers included in the buffer circuit 130.

Referring to FIGS. 3 and 4, in one or more example embodiments, the output buffer 130-1 may include an amplifier AMP, an output switch SW_O, a line resistor RL, and a line capacitor CL.

The output switch SW_O can connect an output node N3 and the channel CH1 to each other in response to a control signal included in output control information CON1. Thereby, a data voltage Vout output from the amplifier AMP can be supplied to a data line DL1 through the output channel CH1. The channel CH1 may be connected to an output terminal OUT1.

The line resistor RL and the line capacitor CL may be disposed for stabilization and/or time constant control of a signal line between the output node N3 and the channel CH1.

The amplifier AMP can apply a data voltage Vout to the output node N3 connected to the channel CH1. In one or more aspects, the amplifier AMP can generate a data voltage Vout based on a first input voltage input to a first input terminal IN1 and a second input voltage applied to a second input terminal IN2. The amplifier AMP can apply the data voltage Vout to the output node N3 connected to the channel CH1. For example, the amplifier AMP may be implemented as a buffer amplifier, and can apply a data voltage Vout generated by using an image data voltage VDATA input to the first input terminal IN1 and an output voltage fed back to the second input terminal IN2 to the output node N3. The first input terminal IN1 may be a non-inverting input terminal and the second input terminal IN2 may be an inverting input terminal, but aspects of the present disclosure are not limited thereto.

In one or more aspects, the amplifier AMP may include an input circuit 132 and an output circuit 134.

The input circuit 132 can generate a bias signal based on a first input voltage input to the first input terminal IN1 and a second input voltage applied to the second input terminal IN2. The input circuit 132 may be implemented as a single ended differential amplifier, but aspects of the present disclosure are not limited thereto.

The output circuit 134 can generate a rising voltage or a falling voltage as a data voltage Vout in response to the bias signal applied from the input circuit 132 and apply the generated rising voltage or falling voltage to the output node N3.

The output circuit 134 may include a pull-up transistor T1, a pull-down transistor T2, and a capacitance adjustment circuit 1342. The pull-up transistor T1 and the pull-down transistor T2 can apply a preset rising current or falling current to the output node N3 for the output of a corresponding data voltage.

The pull-up transistor T1 can source a rising current from a first driving voltage VDD to the output node N3. The pull-down transistor T2 can sink a falling current from a second driving voltage VSS to the output node N3. The second driving voltage VSS may be a voltage lower than the first driving voltage VDD.

The bias signal provided from the input circuit 132 can be applied to the gate electrode of the pull-up transistor T1, and the pull-up transistor T1 can be turned on for an upward transition of the data voltage Vout. Thereby, the sourcing of the rising current to the output node N3 can be performed.

The bias signal provided from the input circuit 132 can be applied to the gate electrode of the pull-down transistor T2, and the pull-down transistor T2 can be turned on for a downward transition of the data voltage Vout. Thereby, the sinking of the falling current to the second driving voltage VSS can be performed.

The capacitance adjustment circuit 1342 can adjust the capacitance of the output node N3 based on the magnitude or rate of a data voltage change (i.e., the magnitude or rate of an image data change) between adjacent pixel rows. The capacitance adjustment circuit 1342 may include compensation capacitors (CC1, CC2, and CC3) and switches (SW1, SW2, and SW3).

The compensation capacitors (CC1, CC2, and CC3) may be connected in parallel between a common node of the gate electrode of the pull-up transistor T1 and the gate electrode of the pull-down transistor T2 and the output node N3. The common node may be a line (node) in which a first node N1 corresponding to the gate electrode of the pull-up transistor T1 and a second node N2 corresponding to the gate electrode of the pull-down transistor T2 are commonly connected.

The switches (SW1, SW2, and SW3) may be connected between the common node and terminals of the capacitors (CC1, CC2, and CC3), respectively. The switches (SW1, SW2, and SW3) can selectively switch the compensation capacitors (CC1, CC2, and CC3), respectively, in response to output control information CON1. For example, the number of the switches (SW1, SW2, and SW3) and the number of compensation capacitors (CC1, CC2, and CC3) may be the same.

The size and number of respective capacitances of the compensation capacitors (CC1, CC2, and CC3) may vary depending on design requirements. For convenience of description, discussions are provide based on an example where capacitances of first to fourth compensation capacitors (CC1, CC2, CC3, and CC4) or first to third compensation capacitors (CC1, CC2, and CC3) in FIG. 4 have the same size or capacity.

The first electrodes of the compensation capacitors (CC1, CC2, and CC3) may be connected to the common node, and the second electrodes thereof may be connected to the output node N3. Accordingly, the compensation capacitors (CC1, CC2, and CC3) can stabilize a voltage between the gate electrodes of the pull-up transistor T1 and the pull-down transistor T2 and the output node N3. That is, by the configuration of connecting the compensation capacitors (CC1, CC2, and CC3), a voltage Vgs between the gate and source electrodes of the pull-up transistor T1 can be stabilized, and a rising voltage applied to the output node N3 can be stabilized. Further, each of the compensation capacitors (CC1, CC2, and CC3) can stabilize a voltage Vgd between the gate and drain electrodes of the pull-down transistor T2, and thereby, a falling voltage applied to the output node VO can be stabilized.

The switches (SW1, SW2, and SW3) can be turned on according to output control information CON and connect the corresponding compensation capacitors (CC1, CC2, and CC3) to the common node. Accordingly, the compensation capacitors (CC1, CC2, and CC3) can be connected in parallel with each other, and as the number of connected compensation capacitors increases, an equivalent capacitance (compensation capacitance) can increase.

The switches (SW1, SW2, and SW3) can control the number of the compensation capacitors (CC1, CC2, and CC3) connected to the common node based on a difference between image data of pixel rows. For example, the switches (SW1, SW2, and SW3) can control the number of the compensation capacitors (CC1, CC2, and CC3) connected to the common node according to a voltage difference between a first data voltage supplied to pixels of a previous pixel row and a second data voltage supplied to a current pixel row.

For example, as a difference between the first data voltage and the second data voltage increases, the number of the compensation capacitors (CC1, CC2, and CC3) connected to the common node may be reduced. Accordingly, an equivalent capacitance by the connection of the compensation capacitors (CC1, CC2, and CC3) can decrease as the difference between the first data voltage and the second data voltage increases.

For example, the larger a difference in image data, the larger the transition magnitude or rate of a corresponding data voltage is, and in this situation, a corresponding compensation capacitance can be reduced to implement a fast slew rate.

In one or more aspects, the number of the switches (SW1, SW2, and SW3) turned on may vary depending on a difference in image data (i.e., a difference in data voltages). For example, the switches (SW1, SW2, and SW3) may include a first switch SW1, a second switch SW2, and a third switch SW3.

When a difference in image data is less than a preset first threshold value, all of the first to third switches (SW1, SW2, and SW3) can be turned on. For example, when the magnitude or rate of a change in image data and data voltages is relatively small, a corresponding slew rate need not to be fast, and therefore, a corresponding compensation capacitance can be controlled to increase to prevent oscillation of a corresponding output voltage and stabilize the output voltage.

When a difference in image data is greater than or equal to the first threshold value and less than a second threshold value which is greater than the first threshold value, two of the first to third switches (SW1, SW2, and SW3) can be turned on. In this configuration, a corresponding compensation capacitance can be reduced for a relatively fast voltage transition.

When a difference in image data is greater than or equal to the second threshold value, one of the first to third switches (SW1, SW2, and SW3) can be turned on. When a relatively large voltage transition is needed, the connection of the compensation capacitors (CC1, CC2, and CC3) can be controlled to minimize a corresponding compensation capacitance to apply a fast slew rate.

Figure 5:
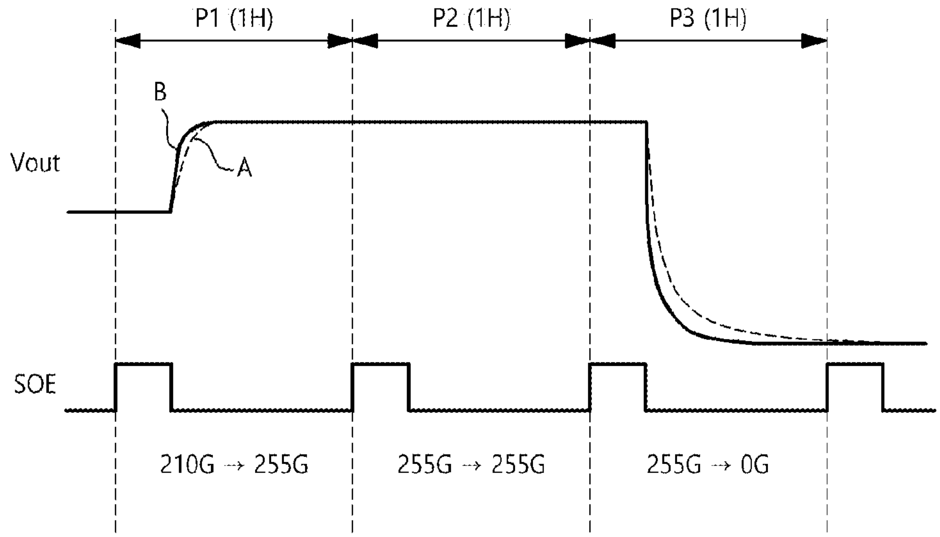
FIG. 5 illustrates an example waveform of an output signal from the output buffer included in output from output buffer of FIG. 4.
Figure 6:
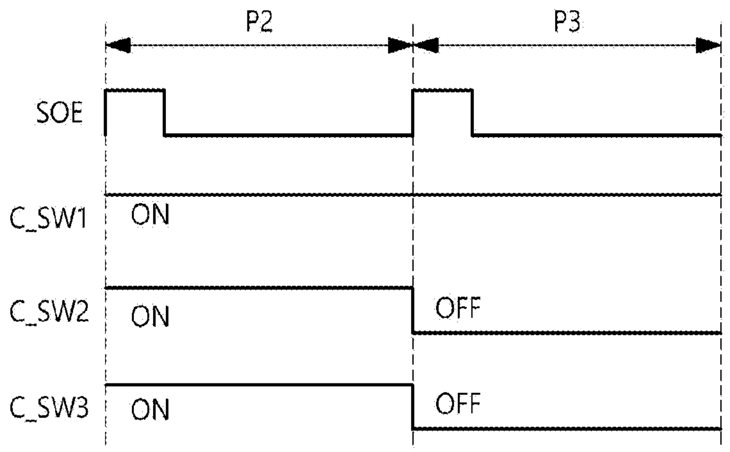
FIG. 6 illustrates example signals supplied to switches of the output buffer of FIG. 4.

FIG. 5 illustrates an example waveform of an output signal from the output buffer of FIG. 4, and FIG. 6 illustrates example signals supplied to switches of the output buffer of FIG. 4.

Referring to FIGS. 4, 5, and 6, in one or more example embodiments, the output circuit 134 of the output buffer 130-1 can output a data voltage Vout to the channel CH1 on one horizontal period (1H) basis according to a source output enable signal SOE.

A gray level of image data corresponding to a data voltage Vout output from the channel CH1 can vary. As shown in FIG. 5, a data voltage Vout corresponding gray level 210 210G may be output prior to a first period P1, and in response to the source output enable signal SOE in the first period P1, the data voltage Vout may transition to a value corresponding to gray level 255 255G.

In a second period P2, the image data may be maintained, and the data voltage Vout corresponding to gray level 255 255G may be maintained.

In a third period P3, in response to the source output enable signal SOE, the data voltage Vout may transition from gray level 255 255G to a value corresponding to gray level 0 0G.

According to a driving method of a comparative example A in FIG. 5, a corresponding compensation capacitance may have a constant value regardless of a change in image data. Accordingly, the oscillation and slew rate of the output data voltage Vout cannot be controlled.

The output circuit 134 according to an example embodiment of the present disclosure can control the switches (SW1, SW2, and SW3) based on output control information CON1. The output control information CON1 may include a first switch control signal C_SW1, a second switch control signal C_SW2, and a third switch control signal C_SW3, which can control the switches (SW1, SW2, SW3) respectively according to a difference in image data (a difference in gray levels, or a difference in data voltages) between adjacent horizontal periods.

As illustrated in FIGS. 5 and 6, in the second period P2 in which there is no change in image data and the data voltages Vout, each of the first to third switch control signals (C_SW1, C_SW2, and C_SW3) may have a turn-on level ON for turning on the first to third switches (SW1, SW2, and SW3). Accordingly, the first to third switches (SW1, SW2, and SW3) of the capacitance adjustment circuit 1342 can be turned on during the second period P2.

As all of the first to third switches (SW1, SW2, and SW3) are turned on, a corresponding equivalent compensation capacitance in the second period P2 may have the greatest value, and the oscillation of the data voltage Vout in the second period P2 in which the data voltage Vout is maintained can be minimized or prevented. Accordingly, the data voltage Vout can be output stably.

FIG. 6 illustrates that a logic level for turning on each signal is a high level. but aspects of the present disclosure are not limited thereto. For example, depending on types of the switches (SW1, SW2, SW3), the switches (SW1, SW2, and SW3) may be turned on by a signal of a logic low level.

In the third period P3 where the magnitude or rate of a change in image data and data voltages Vout is the greatest, the first switch control signal C_SW1 may have a turn-on level ON, and each of the second and third switch control signals (C_SW2 and C_SW3) may have a turn-off level OFF. According to this implementation, only the first switch SW1 may be turned on during the third period P3, and only the first compensation capacitor CC1 may be connected to the common node.

Therefore, in the case of example (B) of FIG. 5 of the present disclosure, compared to comparative example (A), a corresponding equivalent compensation capacitance may have a minimum value, the slew rate can increase faster and the data voltage Vout can reach a target level faster. In one or more aspects, a capacitance of the first compensation capacitor CC1 may be less than capacitances of the second and third compensation capacitors (CC2 and CC3).

Figure 7:
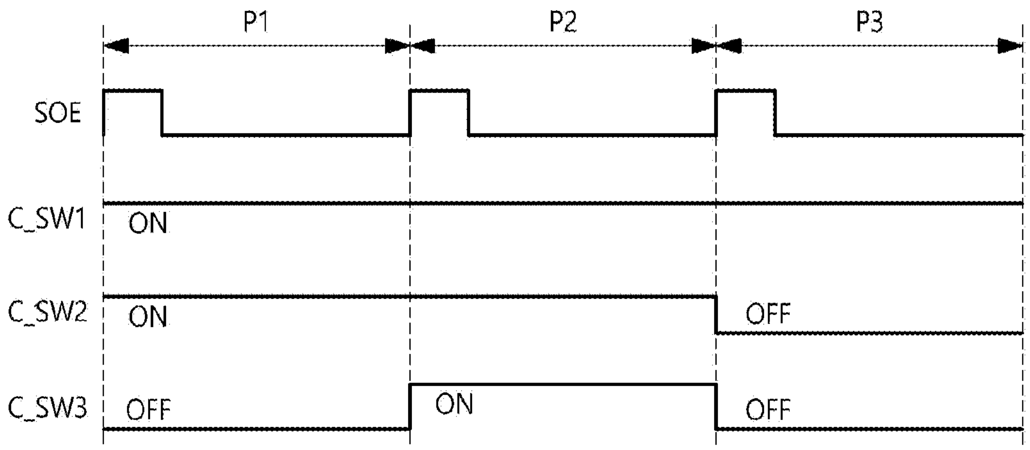
FIG. 7 illustrates other example signals supplied to switches of the output buffer of FIG. 4.

FIG. 7 illustrates other example signals supplied to the switches of the output buffer of FIG. 4.

Referring to FIGS. 4, 5, 6, and 7, in one or more example embodiments, the output circuit 134 of the output buffer 130-1 may output a data voltage Vout to the channel CH1 on one horizontal period (1H) basis according to a source output enable signal SOE.

In discussing the configuration of FIG. 7, since the operations of second and third periods (P2 and P3) have been described with reference to FIG. 6, repeated discussions therefor are not provided for conciseness.

Output control information CON1 may be generated based on at least one preset threshold value. In one or more aspects, the threshold value may be set based on a difference in image data. When a difference in image data is less than a preset first threshold value, all of the first to third switches (SW1, SW2, and SW3) can be turned on. When a difference in image data is greater than or equal to the first threshold value and less than a second threshold value which is greater than the first threshold value, two of the first to third switches (SW1, SW2, and SW3) can be turned on. When a difference in image data is greater than or equal to the second threshold value, one of the first to third switches (SW1, SW2, and SW3) can be turned on.

In the first period P1, a difference in image data may correspond to logic level 45, which may be greater than or equal to the first threshold value and less than the second threshold value. In this implementation, as illustrated in FIG. 7, each of first and second switch control signals (C_SW1 and C_SW2) may have a turn-on level ON, and a third switch control signal C_SW3 may have a turn-off level OFF. A corresponding equivalent compensation capacitance may be the sum of the capacitances of the first capacitor CC1 and the second capacitor CC2. Therefore, the oscillation of the output data voltage Vout can be prevented and the slew rate can be improved at the same time.

As described above, according to the example embodiments described embodiments described herein, the data driver 100 and the display device DD including the data driver 100 can improve both the phase margin characteristic (minimizing output oscillation) and the data charge and discharge characteristics (slew rate control) by adjusting the compensation capacitance of the output buffer 130-1 based on a difference between image data (data voltages) of adjacent horizontal periods (pixel rows). Thus, in a period where the magnitude or rate of a data change is relatively small, the compensation capacitance can be increased to improve the phase margin characteristic, and in a period when the magnitude or rate of a data change is relatively large, the compensation capacitance can be decreased to improve the data charge and discharge characteristics.

Further, power consumption can be reduced by adaptively adjusting the compensation capacitance of the output buffer 130-1 as needed.

Aspects, examples, and embodiments of the present disclosure have been provided with reference to drawings, and those skilled in the art will understand that the present disclosure can be variously modified and changed within the scope and spirit of the present disclosure including those set forth in the following patent claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
- a display panel configured to display an image, and comprising pixels and data lines connected to the pixels;
- a timing controller configured to provide image data corresponding to the image; and
- a data driver comprising at least one output buffer configured to output an analog data voltage corresponding to the image data to a channel electrically connected to a corresponding one of the data lines, wherein the output buffer comprises:
- one or more transistors configured to apply a preset rising current or falling current to output the data voltage to an output node connected to the channel; and
- a capacitance adjustment circuit configured to adjust a capacitance of the output node based on a magnitude or rate of a data voltage change between adjacent pixel rows.

2. The display device of claim 1, wherein the one or more transistors comprise:
- a pull-up transistor connected between a high voltage source or a high voltage node and the output node; and
- a pull-down transistor connected between the output node and a low voltage source or a low voltage node.

3. The display device of claim 2, wherein the capacitance adjustment circuit comprises:
- compensation capacitors connected in parallel between a common node of a gate electrode of the pull-up transistor and a gate electrode of the pull-down transistor and the output node; and
- switches each connected between the common node and a respective one of the compensation capacitors, and configured to selectively switch based on output control information.

4. The display device of claim 3, wherein the switches are configured to control a number of compensation capacitors connected to the common node based on a voltage difference between a first data voltage supplied to pixels of a previous pixel row and a second data voltage supplied to a current pixel row.

5. The display device of claim 4, wherein the switches are configured to control the number of compensation capacitors connected to the common node among the compensation capacitors to decrease as a difference between the first data voltage and the second data voltage increases.

6. The display device of claim 4, wherein the switches are configured to control an equivalent capacitance of the compensation capacitors to decrease as a difference between the first data voltage and the second data voltage increases.

7. The display device of claim 3, wherein the data driver further comprises:
- a latch circuit configured to rearrange the image data in a parallel type;

a line memory configured to store rearranged image data output from the latch circuit on a pixel row basis;

a compare circuit configured to calculate a difference between image data of a previous pixel row output from the line memory and image data of a current pixel row output from the latch circuit; and a controller configured to control turn-on or turn-off of the switches based on a calculation result of the compare circuit.

8. The display device of claim 7, wherein the compare circuit is configured to calculate a difference in the image data between adjacent pixel rows for the channel.

9. The display device of claim 7, wherein the switches comprise first, second, and third switches, and wherein:

when the difference of the image data is less than a first threshold value, the first, second, and third switches are turned on;

when the difference of the image data is greater than or equal to the first threshold value and less than a second threshold value greater than the first threshold value, two of the first, second, and third switches are turned on; and when the difference of the image data is greater than or equal to the second threshold value, one of the first, second, and third switches is turned on.

10. The display device of claim 7, wherein the data driver further comprises a digital-to-analog converter configured to convert the rearranged image data into the data voltage and provide the data voltage to the output buffer.

11. A data driver comprising:

a latch circuit configured to rearrange image data provided serially in a parallel type;

a digital-to-analog converter configured to convert the rearranged image data into a data voltage; and an output buffer configured to output the data voltage to an output node connected to a data line, wherein the output buffer comprises:

a capacitance adjustment circuit configured to adjust a capacitance of the output node based on a magnitude or rate of a data voltage change between adjacent pixel rows.

12. The data driver of claim 11, wherein the output buffer comprises one or more transistors configured to apply a preset rising current or falling current for outputting the data voltage to the output node.

13. The data driver of claim 12, wherein the capacitance adjustment circuit comprises:

compensation capacitors connected in parallel between a common node of a gate electrode of a pull-up transistor included in the one or more transistors and a gate electrode of a pull-down transistor included in the one or more transistors and the output node; and switches connected each between the common node and respective one of the compensation capacitors, and configured to selectively switch based on output control information.

14. The data driver of claim 13, further comprising:

a line memory configured to store the rearranged image data output from the latch circuit on one horizontal cycle basis;

a compare circuit configured to calculate a difference between image data of a previous pixel row output from the line memory and image data of a current pixel row output from the latch circuit; and a controller configured to control turn-on or turn-off of the switches based on a calculation result of the compare circuit.

15. The data driver of claim 13, wherein the switches are configured to control a number of compensation capacitors connected to the common node based on a voltage difference between a first data voltage supplied to pixels of a previous pixel row and a second data voltage supplied to a current pixel row.

16. The data driver of claim 15, wherein the switches are configured to control an equivalent capacitance by the compensation capacitors to decrease as a difference between the first data voltage and the second data voltage increases.

* * * * *